United States Patent
Rao et al.

(10) Patent No.: US 12,136,198 B2
(45) Date of Patent: Nov. 5, 2024

(54) METHOD AND APPARATUS FOR PROCESSING IMAGE

(71) Applicant: BEIJING XIAOMI MOBILE SOFTWARE CO., LTD., Beijing (CN)

(72) Inventors: Qiang Rao, Beijing (CN); Jiakang Deng, Beijing (CN); Hao Jiang, Beijing (CN); Shuangshuang Yin, Beijing (CN); Meiya Chen, Beijing (CN); Yangchenxu Liu, Beijing (CN); Jiaxu Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 42 days.

(21) Appl. No.: 17/956,187

(22) Filed: Sep. 29, 2022

(65) Prior Publication Data

US 2023/0410260 A1    Dec. 21, 2023

(30) Foreign Application Priority Data

Jun. 20, 2022   (CN) .......................... 202210701809.1

(51) Int. Cl.
*G06T 5/70* (2024.01)
*G06T 5/20* (2006.01)
*G06T 7/194* (2017.01)
*H04N 5/262* (2006.01)
(Continued)

(52) U.S. Cl.
CPC ................. *G06T 5/70* (2024.01); *G06T 5/20* (2013.01); *G06T 7/194* (2017.01); *H04N 5/262* (2013.01); *H04N 23/632* (2023.01); *H04N 23/667* (2023.01); *G06T 2207/10024* (2013.01); *G06T 2207/20021* (2013.01); *G06T 2207/20221* (2013.01)

(58) Field of Classification Search
CPC .. H04N 23/63–633; H04N 5/262; G06T 5/20; G06T 5/70
USPC ...................................................... 348/207.99
See application file for complete search history.

(56) References Cited

U.S. PATENT DOCUMENTS

| | | | |
|---|---|---|---|
| 11,087,513 B1* | 8/2021 | Duan | G06T 11/60 |
| 2015/0348239 A1* | 12/2015 | Nestares | H04N 1/6027 382/255 |
| 2017/0091906 A1* | 3/2017 | Liang | G06T 7/11 |

(Continued)

FOREIGN PATENT DOCUMENTS

| | | |
|---|---|---|
| JP | 2009200900 A | 9/2009 |
| JP | 2012165078 A | 8/2012 |

(Continued)

OTHER PUBLICATIONS

European Patent Application No. 22198515.3, Search and Opinion dated May 26, 2023, 10 pages.

(Continued)

*Primary Examiner* — Anthony J Daniels
(74) *Attorney, Agent, or Firm* — Cozen O'Connor

(57) ABSTRACT

A method for processing an image and a mobile terminal. The method includes: obtaining a lens effect instruction, and determining a target blurring algorithm from a plurality of preset blurring algorithms based on the lens effect instruction, in which the blurring algorithms are algorithms for simulating optical lens effects; and obtaining a target image by blurring an image to be processed based on the target blurring algorithm.

18 Claims, 7 Drawing Sheets

(51) Int. Cl.
*H04N 23/63* (2023.01)
*H04N 23/667* (2023.01)

(56) References Cited

U.S. PATENT DOCUMENTS

| | | | | |
|---|---|---|---|---|
| 2017/0148142 | A1* | 5/2017 | Park | H04N 23/80 |
| 2018/0041709 | A1* | 2/2018 | Konttori | H04N 23/57 |
| 2019/0102056 | A1* | 4/2019 | Sabater | G06F 3/0484 |
| 2019/0213714 | A1* | 7/2019 | Neti | G06T 5/70 |
| 2020/0265565 | A1* | 8/2020 | Hwang | G06T 5/70 |
| 2021/0042950 | A1 | 2/2021 | Wantland et al. | |
| 2021/0073953 | A1* | 3/2021 | Lee | G06T 5/70 |
| 2022/0270215 | A1* | 8/2022 | Lee | G06T 7/536 |
| 2022/0272246 | A1* | 8/2022 | Verma | H04N 23/72 |
| 2023/0020616 | A1* | 1/2023 | Manzari | H04N 23/69 |
| 2023/0224442 | A1* | 7/2023 | Demoulin | H04N 9/3147 |
| | | | | 345/419 |

FOREIGN PATENT DOCUMENTS

| | | |
|---|---|---|
| JP | 2016039563 A | 3/2016 |
| KR | 20190127545 A | 11/2019 |
| KR | 20210030466 A | 3/2021 |
| KR | 102262671 B1 | 6/2021 |

OTHER PUBLICATIONS

Liu, D. et al. "Stereo-based bokeh effects for photography" Machine Vision and Applications (2016) vol. 27, pp. 1325-1337.
Japanese Patent Application No. 2022-157535, Office Action dated Mar. 1, 2024, 3 pages.
Japanese Patent Application No. 2022-157535, English translation of Office Action dated Mar. 1, 2024, 3 pages.
Japanese Patent Application No. 2022-157535, Office Action dated Aug. 23, 2023, 5 pages.
Japanese Patent Application No. 2022-157535, English translation of Office Action dated Aug. 23, 2023, 8 pages.
Korean Patent Application No. 10-2022-0123864, Office Action dated Oct. 6, 2023, 7 pages.
Korean Patent Application No. 10-2022-0123864, English translation of Office Action dated Oct. 6, 2023, 12 pages.
Chinese Patent Application No. 202210344787.8, Office Action dated Oct. 19, 2023, 6 pages.
Chinese Patent Application No. 202210344787.8, English translation of Office Action dated Oct. 19, 2023, 12 pages.

* cited by examiner (a)   (b)

1

METHOD AND APPARATUS FOR PROCESSING IMAGE

CROSS-REFERENCE TO RELATED APPLICATIONS

This application is based upon and claims priority to Chinese Patent Application No. 202210701809.1 filed on Jun. 20, 2022, the entire contents of which are incorporated herein by reference for all purposes.

BACKGROUND

With the development of electronic device imaging technology, users increasingly rely on mobile terminals to take photos for many different purposes, and the demands on the photographing capabilities of the mobile terminals are increasing. Shallow depth-of-field effect refers to the image effect that only the vicinity of the focus point is clear and the front and rear scenes are blurred, which highlights the target subject and is widely used in shooting modes such as portrait and close-up.

SUMMARY

Embodiments of the disclosure provide a method for processing an image, a mobile terminal and a non-transitory storage medium.

According to a first aspect of the disclosure, a method for processing an image is provided. The method includes:
obtaining a lens effect instruction, and determining a target blurring algorithm from a plurality of preset blurring algorithms based on the lens effect instruction, in which the blurring algorithms are algorithms for simulating optical lens effects; and
obtaining a target image by blurring an image to be processed based on the target blurring algorithm.

According to a second aspect of the disclosure, a mobile terminal is provided. The mobile terminal includes:
a processor; and
a memory having computer instructions stored thereon, in which the computer instructions are configured to cause the processor to implement the method according to any embodiment of the first aspect.

According to a third aspect of the disclosure, a non-transitory storage medium having computer instructions stored thereon is provided. The computer instructions are configured to cause a computer to implement the method according to any embodiment of the first aspect.

BRIEF DESCRIPTION OF THE DRAWINGS

In order to clearly illustrate technical solutions of embodiments of the disclosure or the related art, a brief description of drawings used in embodiments or in the related art is given below. Obviously, the drawings in the following descriptions are only part embodiments of the disclosure, and for those skilled in the art, other drawings can be obtained according to these drawings without inventive works.

DETAILED DESCRIPTION

Figure 1:
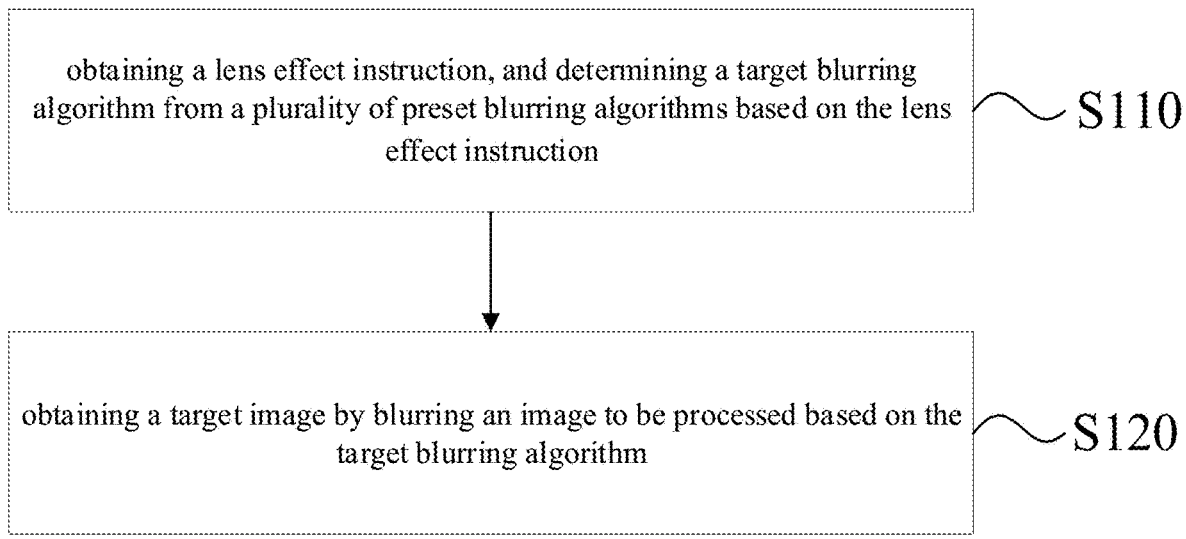
FIG. 1 is a flowchart of a method for processing an image according to some embodiments of the disclosure.

The technical solution of the disclosure will be clearly and completely described below with reference to the accompanying drawings. Obviously, the described embodiments are part of the embodiments of the disclosure, but not all of the embodiments. Based on the embodiments in the disclosure, all other embodiments obtained by those skilled in the art without inventive works shall fall within the protection scope of the disclosure. In addition, the technical features involved in different embodiments of the disclosure described below can be combined with each other as long as they do not conflict with each other.

Currently, people have an increasing demand for using mobile terminals to take photos, and the photos taken by the mobile terminals are expected to have effects comparable to the photos taken by professional cameras. However, due to the size and weight limit of the mobile terminals, the sensor and aperture of the camera system are not comparable to those of the professional cameras. Therefore, each mobile terminal manufacturer provides users with special "portrait mode" or "large aperture mode", and the principle is to simulate the imaging effect of professional cameras through software algorithms.

Depth of field is a concept in the field of imaging, which refers to the range of image that appears clear to the naked eyes, while shallow depth of field refers to the effect that only the vicinity of the focus point is clear and the front and rear scenes are blurred. The shallow depth of field effect is widely used in the "portrait mode" photography for characteristic of highlighting the photographed subjects.

In the related art, generally, the mobile terminal provides only the "portrait mode" for the user. When the user selects the portrait mode to take photos, the system can perform image processing on the collected image according to the preset algorithm, so as to achieve the shallow depth of field effect by highlighting the portrait or subject and blurring the rest of the background.

However, the inventors of the disclosure have found that, for different photographing environments, the shallow depth of field effect often presents inconsistent picture perception. For example, for a portrait photographing scene in good lighting without a lot of highlight areas, blurring the background other than the portrait can achieve excellent image effect. However, for a portrait photographing scene in dim lighting with a large number of light spots, if the same algorithm is adopted, the brightness and contrast of the light spot area will decrease, and the image quality of the image is poor. For another example, in a backlighting portrait photographing scene, there are a large number of highlight areas in the image, if the same algorithm is adopted, problems such as overall whitening of the image and dark portrait areas may occur, resulting in poor image quality.

It can be seen from this that the blurring algorithms of the mobile terminals in the related art cannot perform specific image processing on different photographing scenes, resulting in poor imaging effect in some scenes, thus it is difficult to meet the user's photographing requirements.

Based on the above defects, embodiments of the disclosure provide a method for processing an image, an apparatus for processing an image, a mobile terminal and a storage medium, so as to improve the imaging quality of the shallow depth-of-field effect image of the mobile terminals and meet the user requirements for taking photos.

Firstly, it is worth noting that the solution of the disclosure relates to image processing, and all the portrait images in the following text are used with the permission of the person being photographed. In addition, in the embodiments of the disclosure, for the purpose of protecting personal privacy, all the face areas are blurred. Then, in the solution of the disclosure, in the actual application process, there is no need to blur the face areas, which can be understood by those skilled in the art, and details are not repeated in the disclosure.

In addition, it is understood that in the following embodiments of the disclosure, unless otherwise specified, images may be color images, that is, images including Red, Green and Blue (RGB) channels. In order to meet the format requirements, the images in the following embodiments are uniformly presented as grayscale images, which will not be repeated in this disclosure.

In the first aspect, embodiments of the disclosure provide a method for processing an image, which can be applied to a mobile terminal. The mobile terminal of the embodiments of the disclosure may be any type of device suitable for implementation, such as a smart phone, a tablet computer, and a handheld computer, which is not limited in the disclosure.

As illustrated in FIG. 1, in some implementations, the method for processing an image of the disclosure includes:

S110, obtaining a lens effect instruction, and determining a target blurring algorithm from a plurality of preset blurring algorithms based on the lens effect instruction; and S120, obtaining a target image by blurring an image to be processed based on the target blurring algorithm.

It is understood that the method of the disclosure is mainly aimed at images with the shallow depth of field effect, and the most important processing of the shallow depth of field effect is image blurring processing.

In embodiments of the disclosure, a plurality of blurring algorithms are stored in the mobile terminal in advance for different photographing environments. The blurring algorithm refers to software algorithm for image processing of the image to be processed. The blurring algorithms can be pre-programmed and cached in the memory of the mobile terminal, so that the cached blurring algorithms are called for image processing when performing the blurring process on the image to be processed, to generate the target image.

The blurring algorithms in the embodiments of the disclosure are software algorithms for simulating optical lens effects. The optical lens effects refer to some unique effects presented by professional camera lenses. For example, the image taken by the rotating focal lens presents swirly bokeh effect, and the swirly bokeh effect refers to the effect of the light spot at the out-of-focus edge appearing to be compressed into a non-circular shape due to unavoidable structural defects of the optical lens. Moreover, the image taken by soft focus lens presents soft-focus bokeh effect, and the soft-focus bokeh effect refers to the effect of making the subject in the image clear and soft by using deliberately designed spherical phase difference of the soft focus lens. For another example, the black-and-white image taken by the black-and-white lens presents black and white bokeh effect, which has higher contrast, so that levels of light and dark of the image is prominent, and the image has a cinematic quality.

Therefore, in the disclosure, a plurality of preset blurring algorithms are used to simulate the various optical lens effects described above, so that the images can be rendered with quality comparable to that of professional cameras. The specific algorithm processing process is described below in the disclosure.

In embodiments of the disclosure, the number of the preset blurring algorithms stored in the mobile terminal can be set according to specific requirements, which is not limited in the disclosure. For example, in an example, when the mobile terminal shoots images with the shallow depth of field effect, the mobile terminal can provide the user with a total of four optical lens effects, i.e., standard bokeh effect, swirly bokeh effect, soft-focus bokeh effect, and black and white bokeh effect, in which each optical lens effect corresponds to one blurring algorithm, that is, the mobile device in this example has 4 pre-stored blurring algorithms.

Since a plurality of blurring algorithms are stored in the mobile terminal in advance, when processing one or more images to be processed, the target blurring algorithm needs to be determined from the blurring algorithms, and the target blur algorithm is an algorithm used for performing image processing on the image to be processed.

In embodiments of the disclosure, the target blurring algorithm may be determined from the blurring algorithms according to the obtained lens effect instruction. In some embodiments, the lens effect instruction may be an instruction generated based on a user input instruction, that is, the target blurring algorithm is selected by the user independently. In other embodiments, the lens effect instruction may be an instruction determined based on the current photographing environment parameters, that is, the target blurring algorithm is automatically determined and selected by the system, which will be described in the following embodiments of the disclosure, and will not be described in detail here.

After the target blurring algorithm is determined, the target image can be obtained by blurring the image to be processed using the target blurring algorithm.

In embodiments of the disclosure, the image to be processed refers to an image that needs to be subjected to blurring processing, which may be an image collected by an image acquisition device of a mobile terminal such as a camera of a smartphone. The image to be processed may also be an image received by the mobile terminal from other devices, for example, the smartphone can receive an image to be processed sent by an external device. The image to be processed may also be an image downloaded by the mobile terminal through the network, which is not limited in the disclosure.

The image to be processed may be a color image. The color image described in the embodiments of the disclosure refers to an image in which each pixel of the image is composed of RGB components, that is, the image to be processed has three color channels (i.e., RGB channels).

For example, taking the image to be processed being an image captured by a camera module of a smartphone as an example, after the target blurring algorithm is determined, the target blurring algorithm can be used to blur the captured image to be processed to obtain the target image after the blurring process.

Based on the above examples, when the mobile terminal shoots the images with the shallow depth of field effect, a total of four preset blurring algorithms are provided, i.e., a standard bokeh algorithm, a swirly bokeh algorithm, a soft-focus bokeh algorithm, and a black and white bokeh algorithm. Therefore, when the user takes a portrait photo in an environment in good lighting without a large number of highlight areas, the standard bokeh algorithm can be used for processing. When the user takes a portrait photo in a backlight environment, the soft-focus bokeh algorithm can be used for processing. When the user takes a portrait photo at night where there are a large number of light spots, the swirly bokeh algorithm can be used for processing.

It can be seen from the above that, in embodiments of the disclosure, a plurality of blurring algorithms are stored in the mobile terminal in advance, so that different blurring algorithms can be used for different photographing scenes, and different optical lens effects can be specifically simulated in different photographing scenes, so as to improve the image quality, and meet the requirements of the user for taking photos in various scenarios, thereby improving the user's photographing experience.

For convenience of description, in the following embodiments of the disclosure, the preset blurring algorithms of the mobile terminal are described by taking the standard bokeh algorithm, the soft-focus bokeh algorithm, the swirly bokeh algorithm and the black and white bokeh algorithm as examples. However, those skilled in the art can understand that the algorithms in the method of the disclosure are not limited to the above four blurring algorithms, and may also be any other blurring algorithms suitable for implementation, which is not limited in the disclosure.

Figure 2:
FIG. 2 is an example diagram of a target image in a method for processing an image according to some embodiments of the disclosure.
Figure 3:
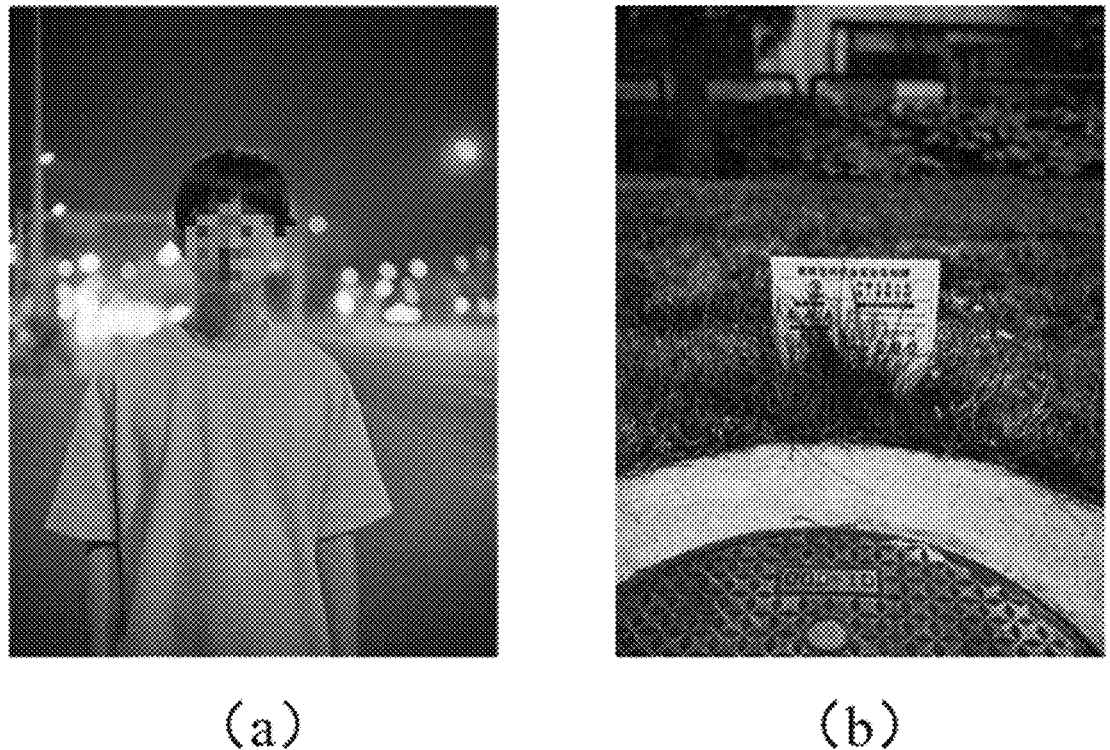
FIG. 3 is an example diagram of a target image in a method for processing an image according to some embodiments of the disclosure.

FIG. 2 and FIG. 3 are example diagrams of the effects of the four blurring algorithms in the above example. The effect and applicable environment of the blurring algorithm are briefly described below with reference to FIG. 2 and FIG. 3.

As illustrated in FIG. 2 (a), this example is an example of an image processed by the standard blurring algorithm. It can be seen that in a photographing scene in good lighting without a lot of highlight areas, the standard blurring algorithm can be used to retain better details and color information in the background, while making the foreground portrait more prominent, so as to achieve good overall effect of the image.

As illustrated in FIG. 2 (b), this example is an example of an image processed by the soft-focus bokeh algorithm. It can be seen that in a backlighting scene, the highlight areas are enhanced to make the whole image more delicate and soft, and the portrait is brightened to avoid problems such as the portrait being too dark, and make the portrait more prominent.

As illustrated in FIG. 3 (a), this example is an example of an image processed by the swirly bokeh algorithm. It can be seen that there are a large number of light spots in the background of an image taken at night, and the light spot area can retain good brightness and contrast to be distinguished from the background, which can effectively set off the foreground portrait, thereby making the portrait image have a better sense of atmosphere.

As illustrated in FIG. 3 (b), this example is an example of an image processed by the black and white bokeh algorithm. The black and white bokeh is often not suitable for portrait, but more suitable for scenes. In this example, it can be seen that there is a good level of light and dark between the objects in the foreground and the objects in the background, which improves the cinematic sense of the image.

The effect of each blurring algorithm is illustrated above with reference to the example diagrams. The principle process of each blurring algorithm will be described separately in the following embodiments of the disclosure, and will not be expanded here.

In some implementations, the user may independently select the target blurring algorithm for the image to be processed, which will be described below with reference to the implementation in FIG. 4.

Figure 4:
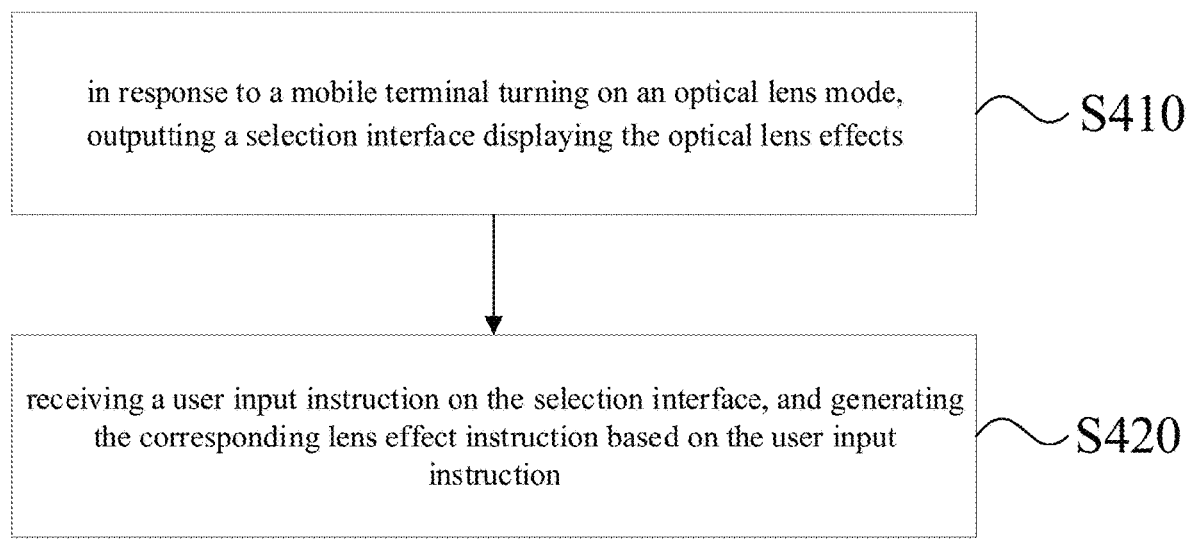
FIG. 4 is a flowchart of a method for processing an image by selecting a target blurring algorithm according to some embodiments of the disclosure.

As illustrated in FIG. 4, in some implementations, according to the method of the disclosure, obtaining the lens effect instructions includes:

S410, in response to a mobile terminal turning on an optical lens mode, outputting a selection interface displaying the optical lens effects; and S420, receiving a user input instruction on the selection interface, and generating the corresponding lens effect instruction based on the user input instruction.

It can be understood that the method of embodiments of the disclosure is mainly aimed at the photographing scene with the shallow depth of field effect, but the user does not always expect to obtain the images with the shallow depth of field effect when taking photos. Therefore, in embodiments of the disclosure, a button or a gesture instruction for enabling the shallow depth of field effect may be set in the mobile terminal.

Figure 5:
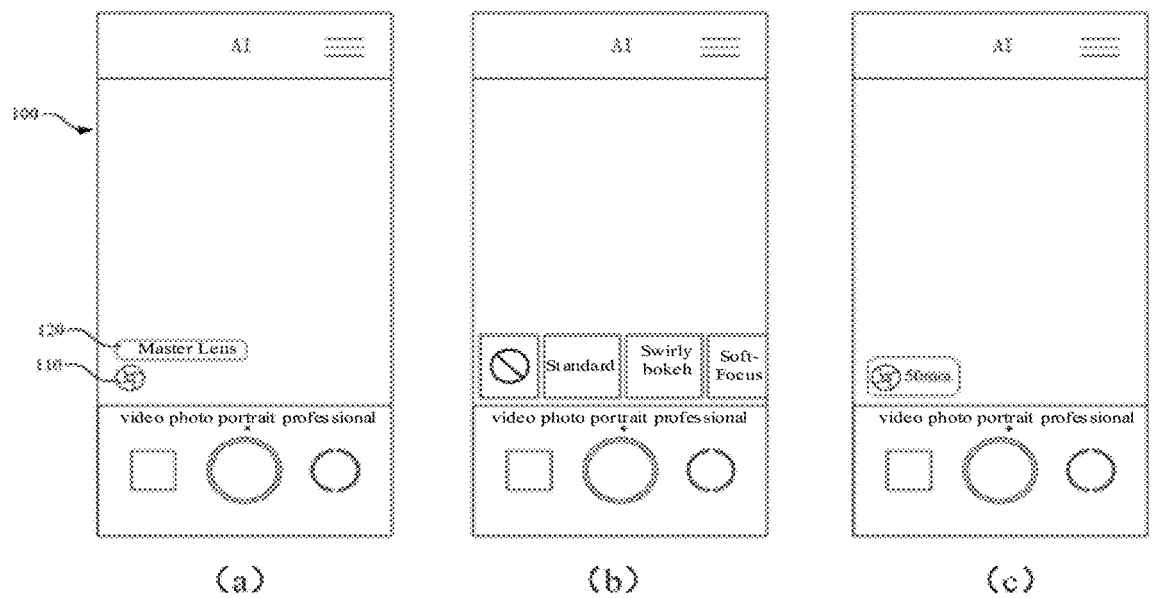
FIG. 5 is a schematic diagram of a method for processing an image according to some embodiments of the disclosure.

For example, in an example, as illustrated in FIG. 5 (a), a button 110 is provided in the photographing interface 100 of the mobile terminal. The user can click the button 110 to enable the optical lens mode, that is, enter the shallow depth-of-field effect photographing mode. In addition, a text bubble 120 may also be set near the button 110, and relevant prompt information such as "click to enable the Masterlens" may be marked in the text bubble, which is not repeated in this disclosure.

After the user clicks the button 110, it means that the mobile terminal turns on the optical lens mode, and the output display interface at this time may be as shown in FIG. 5 (b). That is, the selection interface displaying each bokeh effect is output in a preview interface. For example, in the above example, four tabs including "Standard", "Swirly bokeh", "Soft-Focus" and "Black and White" can be output and displayed, each tab may display the schematic diagram of the corresponding optical lens.

After the user clicks a certain tab of the selection interface, the mobile terminal can receive the user input instruction, in which the user input instruction represents the optical lens effect selected by the user, so that the mobile terminal can determine the corresponding target optical lens effect according to the user input instruction, and generate the lens effect instruction corresponding to the target optical lens effect.

For example, in an example, after the user clicks the tab of "Swirly bokeh" on the interface shown in FIG. 5 (b), the mobile terminal can determine the swirly bokeh effect corresponding to the tab of "Swirly bokeh" as the target optical lens effect, and generate the lens effect instruction corresponding to the swirly bokeh effect. The display interface can be switched to the one shown in in FIG. 5 (c), and the focal length of the lens that corresponds to the swirly bokeh effect can be shown in the preview interface.

In other embodiments, the user can also enable the optical lens mode through a preset gesture instruction, for example, the preset gesture instruction may be any gesture operation such as double-click, touch and slide, and long-press, which is not limited in the disclosure. Therefore, there is no need to set the button 110 on the display interface, which can be fully realized and understood by those skilled in the art, and will not be repeated in the disclosure.

In the above example of FIG. 5, the button 110 for enabling the optical lens mode is provided in the camera photographing interface 100. In some embodiments, the button 110 may also be set on the desktop of the mobile terminal, that is, the user can directly enable the camera application by clicking the button 110 on the desktop without enabling the camera application. In other embodiments, each tab of the optical lens effect may also be set on the desktop of the mobile terminal. For example, the four tabs of "Standard", "Swirly bokeh", "Soft-Focus" and "Black and White" are set on the desktop of the mobile terminal, and the user can directly enable the camera application and select the corresponding optical lens effect to take photos by clicking a tab on the desktop, which can be fully realized and understood by those skilled in the art, and will not be repeated in the disclosure.

It can be seen from the above that in embodiments of the disclosure, a plurality of blurring algorithms are stored in the mobile terminal in advance, so that different blurring algorithms can be used for different photographing scenes, and different optical lens effects can be specifically simulated in different photographing scenes, so as to improve the image quality, and meet the requirements of the user for taking photos in various scenarios. Moreover, the blurring algorithm is selected by the user independently, which improves the user's photographing operability and improves the user's photographing experience.

In the above implementation, the user needs to manually select the desired optical lens effect from the plurality of optical lens effects. Considering that some users do not have professional photographing knowledge and expect to casually take photos and acquires images having good imaging effect, these users can not choose the appropriate blurring algorithm according to the current photographing scene, and thus images less than expected may be acquired.

Therefore, in some embodiments of the disclosure, the mobile terminal can automatically choose the target optical lens effect according to the current photographing environment parameters, without the need for manual selection by the user, which will be described below with reference to the embodiment in FIG. 6.

Figure 6:
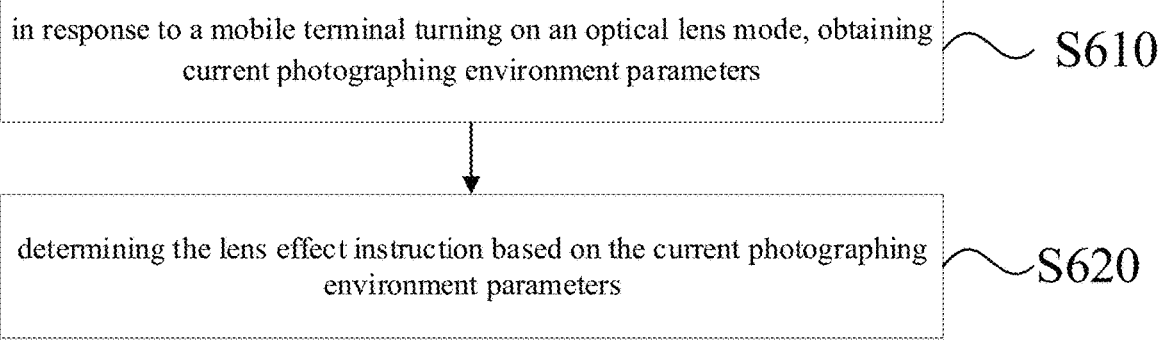
FIG. 6 is a flowchart of a method for processing an image by automatically choosing a target optical lens effect according to some embodiments of the disclosure.

As illustrated in FIG. 6, in some embodiments, according to the method for processing an image of disclosure, obtaining the lens effect instruction includes:

S610, in response to a mobile terminal turning on an optical lens mode, obtaining current photographing environment parameters; and S620, determining the lens effect instruction based on the current photographing environment parameters.

As mentioned above, the method is mainly aimed at the photographing scene with the shallow depth of field effect, but the user does not always expect to obtain the images with the shallow depth of field effect when taking photos. Therefore, in embodiments of the disclosure, a button or a gesture instruction for enabling the shallow depth of field effect may be set in the mobile terminal. For example, as illustrated in FIG. 5, the optical lens mode is enabled through the button 110 on the display interface, which will not be repeated in this disclosure.

After the optical lens mode is enabled, it means that the user expects to perform the blurring processing on the image to be processed, so that the system can obtain the current photographing environment parameters, and determine the target blurring algorithm from the multiple blurring algorithms according to the photographing environment parameters.

The photographing environment parameters represent relevant parameters that affect the imaging effect. For example, in some embodiments, the photographing environment parameters may include a focus distance parameter, an ambient brightness parameter, a subject detection parameter, and a light spot detection parameter.

The focus distance parameter represents the distance between the subject to be photographed and the mobile terminal. It can be understood that, when the distance exceeds a focus distance of the lens, it means that the distance between the subject to be photographed and the mobile terminal is too far and it is difficult to present bokeh effect. Therefore, in some embodiments, a focus distance threshold may be preset according to the lens structure, and by comparing the focus distance parameter of the current photographing scene with the focus distance threshold, it can be determined whether the current focus distance parameter satisfies a preset condition.

The ambient brightness parameter represents the ambient brightness intensity of the current photographing environment. It can be understood that the ambient brightness directly affects the imaging quality, and different blurring algorithms are adopted for different ambient brightness parameters. Therefore, in some embodiments, the corresponding ambient brightness threshold may be preset, and by comparing the ambient brightness parameter of the current photographing scene with the ambient brightness threshold, it can be determined whether the current ambient brightness parameter satisfies a preset condition.

The subject detection parameter indicates whether there is a preset subject in the current photographing range. For example, the preset subject may be a human body, and it can be determined whether the current photographing range of the camera contains a human body through a human body detection method. It can be understood that the blurring algorithms used for portrait images and non-portrait images are different. Therefore, in some embodiments, it is possible to determine whether there is a human body in the current photographing range according to the subject detection parameter, and determine whether the subject detection parameter satisfies a preset condition.

The light spot detection parameter indicates a ratio of high-brightness areas to the area of the current photographing scene. The light spot may be, for example, an area generated by lights or glass reflections. It can be understood that different blurring algorithms need to be adopted for the scene with more light spots and the scene with few light spots. Therefore, in some embodiments, a light spot range threshold may be preset, and by comparing the light spot detection parameter of the current photographing scene and the light spot range threshold, it can be determined whether the current light spot detection parameter satisfies the preset condition.

Certainly, those skilled in the art can understand that the photographing environment parameters of the disclosure are not limited to the above examples, and may be any other parameters suitable for implementation, as long as it is ensured that changes in the photographing environment can be distinguished according to the parameters, which is not limited in the disclosure.

In embodiments of the disclosure, the target optical lens effect can be determined according to a relation between at least one parameter included in the photographing environment parameters and its corresponding preset conditions, and then the corresponding lens effect instruction is generated according to the target optical lens effect.

For example, in some embodiments, in response to the focus distance parameter satisfying a first preset condition, an instruction corresponding to no bokeh effect is determined as the lens effect instruction.

In this embodiment, the focus distance threshold can be preset according to the characteristics of the lens. The specific value of the focus distance threshold is not limited, for example, for a conventional lens of a mobile phone, its focus distance threshold may be set as 5 m.

When taking a picture with the mobile phone, the focus distance between the subject to be photographed and the mobile phone lens can be detected to obtain the focus distance parameter. The distance detection method is not limited in the disclosure, and any existing distance detection methods may be used for implementation, such as depth sensor, and focus AF value, which will not be elaborated in this disclosure.

If the current focus distance parameter exceeds the focus distance threshold, it is determined that the focus distance parameter satisfies the first preset condition, which means that the current subject to be photographed is too far away from the lens at this time, and the depth calculation accuracy will decrease sharply, resulting in poor processing effect of the blurring algorithm. Therefore, in this case, it is determined that no blurring processing is required, that is, no blurring processing is performed on the image to be processed, and the corresponding lens effect instructions may be null.

For example, in some embodiments, in response to the ambient brightness parameter satisfying a second preset condition, an instruction corresponding to soft-focus bokeh effect is determined as the lens effect instruction.

In this embodiment, a corresponding ambient brightness threshold can be preset. When a mobile terminal is used to take a picture, the ambient light brightness parameter of the current photographing scene can be detected. The ambient brightness detection method is not limited in the disclosure, and any existing ambient brightness detection methods can be used for implementation, such as ambient brightness sensor, which will not be described in detail in this disclosure.

If the current ambient brightness parameter exceeds the ambient brightness threshold, it is determined that the ambient brightness parameter satisfies the second preset condition, which means that the ambient light intensity of the current scene is high. Therefore, in this case, it is determined that the soft-focus bokeh effect is the target optical lens effect, and the instruction corresponding to the soft-focus bokeh effect is the target blurring instruction.

For example, in some embodiments, in response to the subject detection parameter satisfying a third preset condition, an instruction corresponding to black and white bokeh effect is determined as the lens effect instruction.

In this embodiment, subject detection may be performed in the current photographing range, to determine whether the current photographing range contains a preset subject. For example, it is determined whether a human body is included in the current photographing range by means of human body detection, face detection, or the like.

If the current photographing range does not contain the preset subject, it is determined that the subject detection parameter satisfies the third preset condition, which means that the current photographing is not for the preset subject. Therefore, in this case, it is determined that the black and white bokeh effect is the target optical lens effect, and the instruction corresponding to the black and white bokeh effect is the target blurring instruction.

For example, in some embodiments, in response to the light spot detection parameter satisfying a fourth preset condition, it is determined that an instruction corresponding to the swirly bokeh effect is the lens effect instruction.

In this embodiment, a corresponding light spot range threshold can be preset. When the mobile terminal is used to take a picture, the light spot detection parameter of the current photographing scene can be detected. The light spot detection method is not limited in the disclosure, and any existing light spot detection methods can be used for implementation, such as brightness threshold division, and pixel capability estimation, which will not be elaborated in this disclosure.

If the current light spot detection parameter exceeds the light spot range threshold, it is determined that the light spot detection parameter satisfies the fourth preset condition, which means that there are many light spot areas in the current scene. Therefore, in this case, it is determined that the swirly bokeh effect is the target optical lens effect, and the instruction corresponding to the swirly bokeh effect is the target blurring instruction.

For example, in some embodiments, if all the above parameters do not satisfy the corresponding preset conditions, that is, the focus distance parameter does not satisfy the first preset condition, the ambient brightness parameter does not satisfy the second preset condition, the subject detection parameter does not satisfy the third preset condition, and the light spot detection parameter does not satisfy the fourth preset condition, in this case, it is determined that the standard bokeh effect is the target optical lens effect, and an instruction corresponding to the standard bokeh effect is determined as the target blurring instruction.

The mobile terminal determines the target optical lens effect and generates the corresponding lens effect instruction through the above process. After determining the lens effect instruction, the mobile terminal determines the target blurring algorithm according to the lens effect instruction, and generate the target image by blurring the image to be processed by using the target blurring algorithm.

It can be seen from the above that a plurality of blurring algorithms are stored in the mobile terminal in advance, so that different blurring algorithms can be used for different photographing scenes, and different optical lens effects can be specifically simulated in different photographing scenes, so as to improve the image quality, and meet the requirements of the user for taking photos in various scenarios, thereby improving the user's photographing experience. In addition, the mobile terminal can automatically select an appropriate blurring algorithm according to the current photographing environment parameters, without the need for manual selection by the user, which can achieve user-perception-free blurring, reduce the user's learning costs and improve the usage experience.

Figure 7:
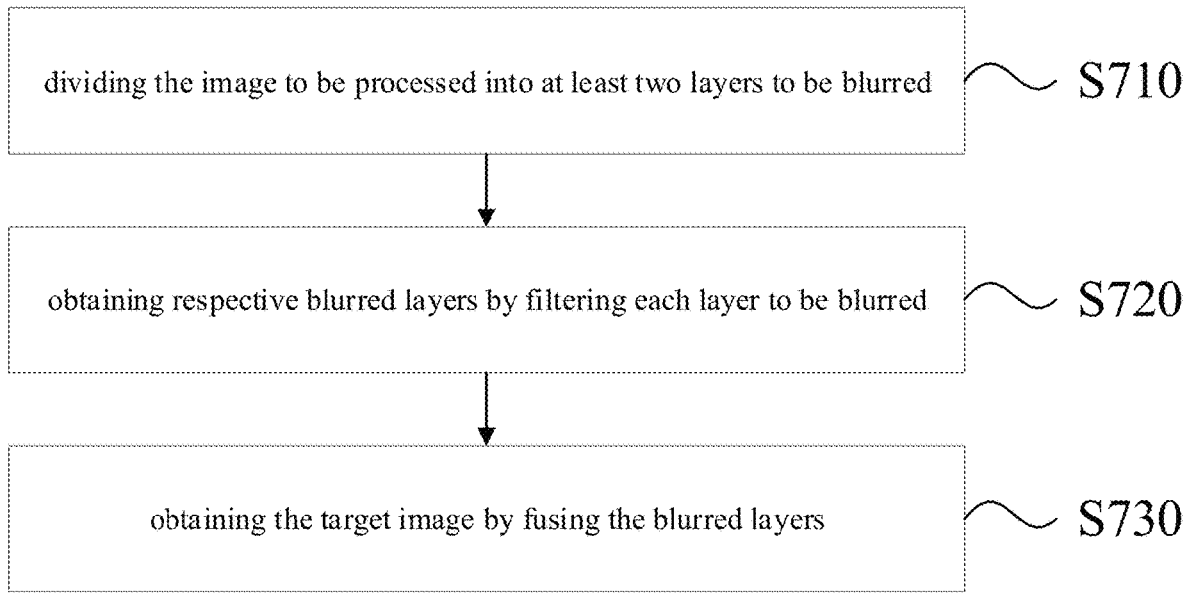
FIG. 7 is a flowchart of a method for processing an image using a standard blurring algorithm according to some embodiments of the disclosure.

As illustrated in FIG. 7, in some embodiments, when the target blurring algorithm is the standard blurring algorithm, obtaining the target image by blurring the image to be processed according to the target blurring algorithm includes:

S710, dividing the image to be processed into at least two layers to be blurred;

S720, obtaining respective blurred layers by filtering each layer to be blurred; and S730, obtaining the target image by fusing the blurred layers.

In embodiments of the disclosure, the image to be processed refers to an image that needs to be blurred, and the image to be processed includes a plurality of different areas to be blurred. Each area to be blurred is separated and determined as one layer to be blurred, and thus a plurality of layers to be blurred can be obtained.

For example, in an example, the image to be processed is a portrait image. The portrait image includes a portrait area that does not require blurring processing and areas to be blurred that requires blurring processing. The areas to be blurred may include background areas with different depths of field. In embodiments of the disclosure, the areas to be blurred can be divided by using the image segmentation technology, to separate the background areas with different depths of field and to further generate a plurality of layers to be blurred.

After the plurality of layers to be blurred are obtained, each layer can be filtered separately. The image filtering process is the process of blurring the image. It can be understood that different layers may be suitable for different bokeh effects. Therefore, in embodiments of the disclosure, different filtering processes can be performed on respective layers, to obtain the corresponding blurred layers of respective layers to be blurred.

After the blurred layer of each layer to be blurred is obtained, the blurred layers are fused to obtain the final target image. For example, the blurred layers are fused firstly, and then is fused with the portrait area that does not need to be blurred to obtain the target image.

Those skilled in the art can undoubtedly understand and fully realize the above points that are not described in detail with reference to the related art, which will not be elaborated in the disclosure.

It can be seen from the above that in embodiments of the disclosure, the image to be processed is divided into multiple layers to be blurred, and respective layers are filtered and fused together to obtain the target image, so that a suitable filtering effect can be provided for each layer, to improve the bokeh effect of each layer, and improve the imaging quality.

Figure 8:
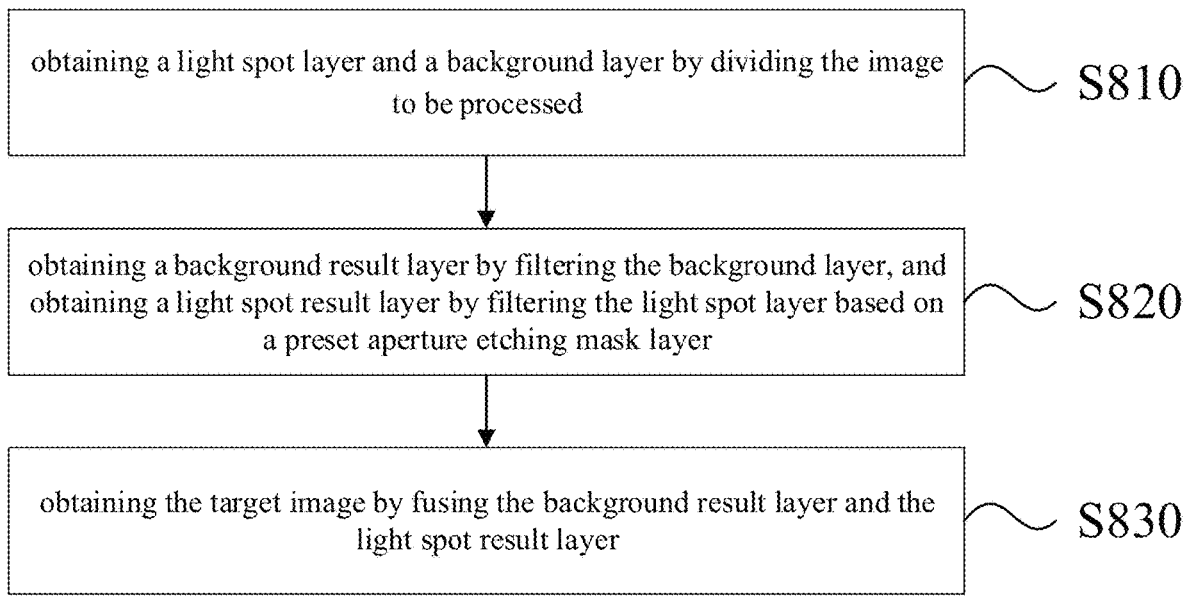
FIG. 8 is a flowchart of a method for processing an image using a swirly bokeh algorithm according to some embodiments of the disclosure.

As illustrated in FIG. 8, in some embodiments, when the target blurring algorithm is the swirly bokeh algorithm, obtaining the target image by blurring the image to be processed based on the target blurring algorithm includes:

S810, obtaining a light spot layer and a background layer by dividing the image to be processed;

S820, obtaining a background result layer by filtering the background layer, and obtaining a light spot result layer by filtering the light spot layer based on a preset aperture etching mask layer; and S830, obtaining the target image by fusing the background result layer and the light spot result layer.

In embodiments of the disclosure, based on the aforementioned, the image to be processed is divided to obtain a non-blurred layer that does not require blurring processing and a layer to be blurred that requires blurring processing. Then, the light spot area in the layer to be blurred is further divided to obtain a light spot layer corresponding to the light spot area and a background layer corresponding to a background area other than the light spot area.

The area to be blurred may include the light spot area formed by reflection of light or grass, and the background area other than the light spot area.

It can be understood that the swirly bokeh algorithm mainly performs blurring processing that is different from other algorithms for the light spot layer. Therefore, in embodiments of the disclosure, for example, Gaussian filtering can be performed on the background layer to obtain the background result layer. For the light spot layer, the light spot layer can be filtered based on the preset aperture etching mask layer to obtain the light spot result layer.

Aperture etching is an imaging characteristic of light spot. The purpose of the aperture etching mask layer is to increase the aperture etching effect for the simulation of the light spot layer through software algorithm, so that the light spot can have more atmospheric effect. For example, in an example, the light spot can be changed into the shape of crescent or heart, to add a sense of atmosphere to the portrait, which can be understood by those skilled in the art, and are not elaborated in the disclosure.

After obtaining the background result layer and the light spot result layer, the two layers can be fused firstly, and then fused with the portrait area that does not need to be blurred, to obtain the target image.

From the above, it can be seen that in embodiments of the disclosure, the aperture etching effect is added to the light spots of the image based on the aperture etching mask layer, so that the swirly bokeh effect can be simulated, and the imaging atmosphere is improved.

Figure 9:
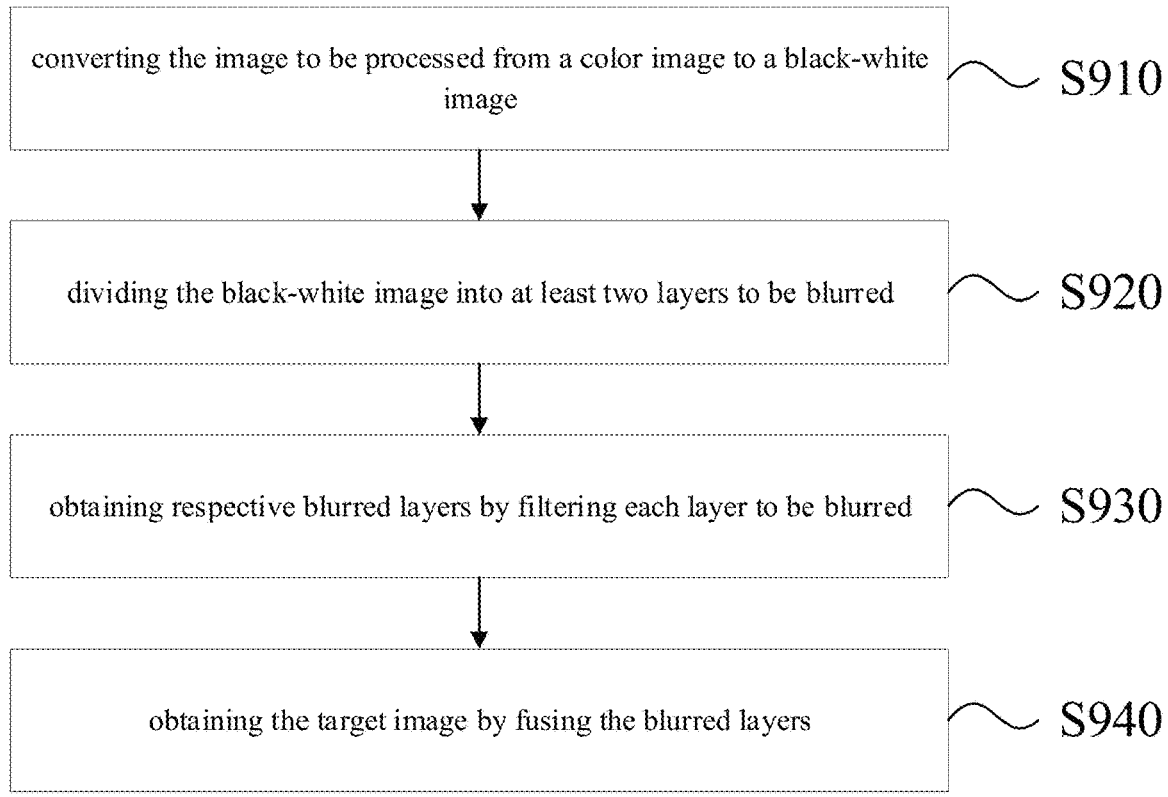
FIG. 9 is a flowchart of a method for processing an image using a black and white bokeh algorithm according to some embodiments of the disclosure.

As illustrated in FIG. 9, in some embodiments, when the target blurring algorithm is the black and white bokeh algorithm, obtaining the target image by blurring the image to be processed based on the target blurring algorithm includes:

S910, converting the image to be processed from a color image to a black-white image;

S920, dividing the black-white image into at least two layers to be blurred;

S930, obtaining respective blurred layers by filtering each layer to be blurred; and S940, obtaining the target image by fusing the blurred layers.

In this embodiment of the disclosure, the difference from the above embodiment in FIG. 7 is that the image to be processed is converted from a color image to a black-white image before blurring the image to be processed. There are many ways to convert the image to be processed from a color image to a black and white image, such as discarding color channels, converting the image mode to grayscale mode, and adjusting hue/saturation parameters, which are not limited in the disclosure.

After converting the color of the image to be processed, the blurring process of the image to be processed may be implemented with reference to the above embodiment of FIG. 7 to obtain the target image, which will not be elaborated in this disclosure.

In some embodiments, after the target image is obtained, a black-white filter can be added to the target image, to further improve the light and dark gradation effect of the target image and improve the image quality.

It can be seen from the above that in embodiments of the disclosure, the bokeh effect of the black-white image is achieved. The image to be processed is divided into a plurality of layers to be blurred, respective layers to be blurred are filtered respectively, and the filtered layers are fused to obtain the target image. Therefore, a suitable filtering effect can be provided for each blurred layer, to improve the bokeh effect of each blurred layer, so that the black-white lens imaging effect can be simulated, and the imaging quality is improved.

Figure 10:
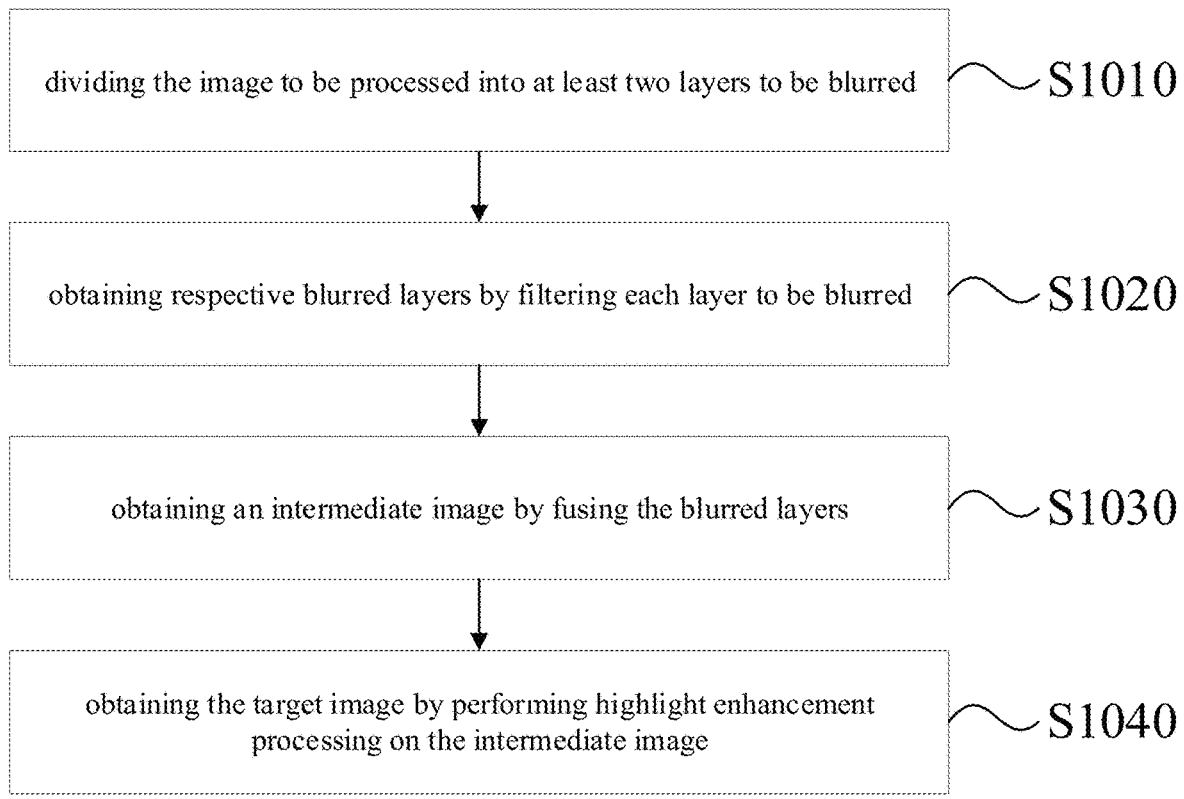
FIG. 10 is a flowchart of a method for processing an image using a soft-focus bokeh algorithm according to some embodiments of the disclosure.

As illustrated in FIG. 10, in some embodiments, when the target blurring algorithm is the soft-focus bokeh algorithm, obtaining the target image by blurring the image to be processed based on the target blurring algorithm includes:

S1010, dividing the image to be processed into at least two layers to be blurred;

S1020, obtaining respective blurred layers by filtering each layer to be blurred;

S1030, obtaining an intermediate image by fusing the blurred layers; and

S1040, obtaining the target image by performing highlight enhancement processing on the intermediate image.

In this embodiment of the disclosure, steps S1010 to S1030 may be the same as those in the above embodiment of FIG. 7, and will not be described in detail in the disclosure. The difference is that when performing the soft-focus bokeh process, after fusing the blurred layers, the intermediate image is obtained, and the intermediate image can be further highlighted and brightened, to highlight the portrait, so that the overall image is more delicate and soft, and problems such as dark portrait can be avoided, thereby making the portrait more prominent.

It can be seen from the above that in embodiments of the disclosure, the image to be processed is divided into multiple layers to be blurred, each layer to be blurred is filtered and all the filtered layers are fused to obtain the target image. Therefore, a suitable filtering effect can be provided for each blurred layer, to improve the bokeh effect of each blurred layer, so that the soft focus lens imaging effect can be simulated and the imaging quality is improved. Moreover, the image is highlighted and brightened to make the overall image more delicate and soft, thereby avoiding problems such as dark portraits and making the portrait more prominent.

In addition, in embodiments of the disclosure, the image to be processed may be an image collected by a mobile terminal in real time, or an image in an album of the mobile terminal. Through the method and process of the above embodiments of the disclosure, post-processing can also be performed on the images in the album, so that the images have the quality as generated by the professional optical lens.

In this scenario, for example, if the user wants to try each optical lens effect, when switching from the first optical lens effect to the second optical lens effect, the first blurring algorithm corresponding to the first optical lens effect can be switched to the second blurring algorithm corresponding to the second optical lens effect, and image processing is performed on the image to be processed by using the second blurring algorithm corresponding to the second optical lens effect, so as to meet the user's usage requirements.

In addition, in the above scenario, the mobile terminal may perform the second optical lens effect processing based on the processing data corresponding to the first optical lens effect, so as to improve the operation speed. The following description will be made with reference to the embodiment of FIG. 11.

Figure 11:
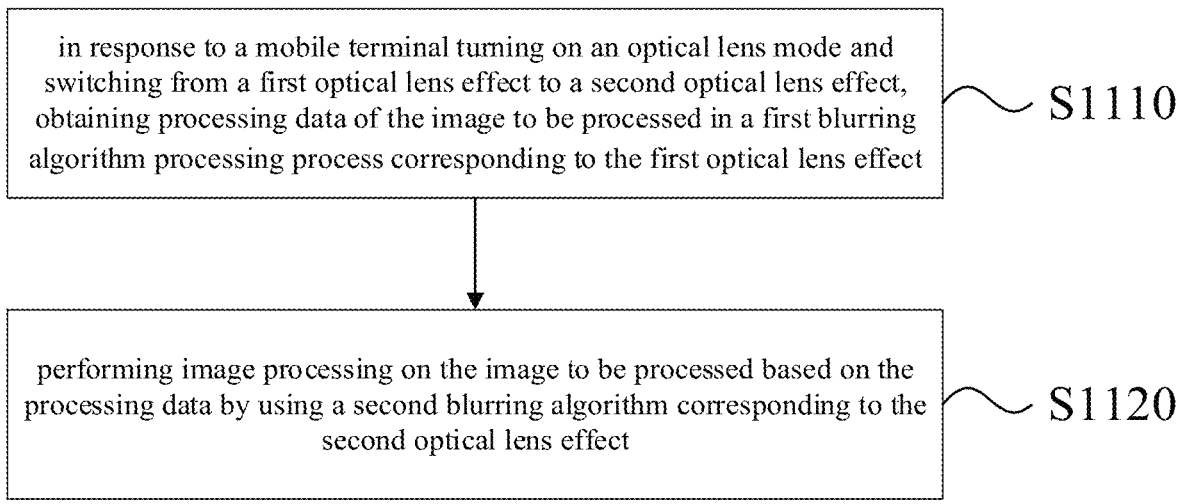
FIG. 11 is a flowchart of a method for processing an image with improved operating speed according to some embodiments of the disclosure.

As illustrated in FIG. 11, in some implementations, the method for processing an image of the example of the disclosure further includes:

S1110, in response to a mobile terminal turning on an optical lens mode and switching from a first optical lens effect to a second optical lens effect, obtaining processing data of the image to be processed in a first blurring algorithm processing process corresponding to the first optical lens effect; and S1120, performing image processing on the image to be processed based on the processing data by using a second blurring algorithm corresponding to the second optical lens effect.

Based on the above description, when the optical lens mode is enabled, the mobile terminal outputs tabs for selecting the optical lens effect, so that after the user selects an optical lens effect, the mobile terminal can process the image to be processed based on the blurring algorithm corresponding to the optical lens effect, to obtain the target image. In embodiments of the disclosure, the optical lens effect is defined as "the first optical lens effect", and the corresponding blurring algorithm is "the first blurring algorithm".

In some embodiments, for example, if the user is not satisfied with the presented image with the first optical lens effect, the first optical lens effect is switched to the second optical lens effect. If the image is re-processed based on the second blurring algorithm corresponding to the second optical lens effect, the calculation amount is large and the time consumption is long.

Through the algorithm process described above, it is known that different optical lens effects often have the same steps or parameters when processing the image, such as light spot detection, image segmentation, and layer filtering. Therefore, in embodiments of the disclosure, part or all of the processing data in the processing process of the first blurring algorithm may be re-used to perform processing by the second blurring algorithm.

For example, when switching from the first optical lens effect to the second optical lens effect, the processing data when the image to be processed is processed by the first blurring algorithm is obtained, and the processing data may include, for example, light spot detection data, image segmentation data, and filtering process data. Therefore, when the image to be processed is processed by the second blurring algorithm, there is no need to perform processing operations such as image segmentation and filtering operations again, and the calculation can be directly performed based on the processing data of the first blurring algorithm, thereby reducing the amount of calculation.

For example, in an example, the first optical lens effect is the swirly bokeh effect, and the second optical lens effect is the soft-focus bokeh effect, when switching from the first optical lens effect to the second optical lens effect, it is possible to perform soft-focus bokeh calculation directly based on the light spot layer, the background layer, the filter map and other data obtained during the process of the swirly bokeh algorithm, thereby shortening the image processing duration.

It can be seen from the above, in the implementation of the disclosure, when switching the optical lens effects, the following image processing can be performed based on the previous image processing data, to reduce the amount of image processing operations and shorten the image processing duration, thereby improving the efficiency.

In a second aspect, embodiments of the disclosure provide an apparatus for processing an image, which can be applied to a mobile terminal. The mobile terminal of the embodiments of the disclosure may be any type of device suitable for implementation, such as a smart phone, a tablet computer, and a handheld computer, which is not limited in the disclosure.

Figure 12:
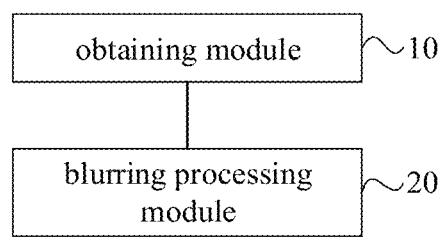
FIG. 12 is a block diagram of an apparatus for processing an image according to some embodiments of the disclosure.

As illustrated in FIG. 12, in some embodiments, the apparatus for processing an image includes: an obtaining module 10 and a blurring processing module 20.

The obtaining module 10 is configured to obtain a lens effect instruction, and determine a target blurring algorithm from a plurality of preset blurring algorithms based on the lens effect instruction. The blurring algorithms are algorithms for simulating optical lens effects.

The blurring processing module 20 is configured to obtain a target image by blurring an image to be processed based on the target blurring algorithm.

It can be seen from the above that, in embodiments of the disclosure, a plurality of blurring algorithms are stored in the mobile terminal in advance, so that different blurring algorithms can be used for different photographing scenes, and different optical lens effects can be specifically simulated in different photographing scenes, so as to improve the image quality, and meet the requirements of the user for taking photos in various scenarios, thereby improving the user's photographing experience.

In some embodiments, the obtaining module 10 is configured to:
  in response to a mobile terminal turning on an optical lens mode, obtain current photographing environment parameters, in which the photographing environment parameters include at least one of a focus distance parameter, an ambient brightness parameter, a subject detection parameter, and a light spot detection parameter; and
  determine the lens effect instruction based on the current photographing environment parameters.

In some embodiments, the obtaining module 10 is configured to:
  determine the lens effect instruction corresponding to the target optical lens effect based on a relation between at least one parameter included in the photographing environment parameters and corresponding preset conditions.

In some embodiments, the obtaining module 10 is configured to:
  in response to the focus distance parameter satisfying a first preset condition, determine an instruction corresponding to no bokeh effect as the lens effect instruction;
  in response to the ambient brightness parameter satisfying a second preset condition, determine an instruction corresponding to soft-focus bokeh effect as the lens effect instruction;
  in response to the subject detection parameter satisfying a third preset condition, determine an instruction corresponding to black and white bokeh effect as the lens effect instruction;
  in response to the light spot detection parameter satisfying a fourth preset condition, determine an instruction corresponding to swirly bokeh effect as the lens effect instruction; and
  in response to the focus distance parameter not satisfying the first preset condition, the ambient brightness parameter not satisfying the second preset condition, the subject detection parameter not satisfying the third preset condition, and the light spot detection parameter not satisfying the fourth preset condition, determine an instruction corresponding to standard bokeh effect as the lens effect instruction.

In some embodiments, the optical lens effect includes at least one of:
  no bokeh effect, soft-focus bokeh effect, black and white bokeh effect, swirly bokeh effect and standard bokeh effect.

It can be seen from the above that, a plurality of preset blurring algorithms are stored in the mobile terminal, so that different blurring algorithms can be used for different photographing scenes, and different optical lens effects can be specifically simulated in different photographing scenes, so as to improve the image quality, and meet the requirements of the user for taking photos in various scenarios, thereby improving the user's photographing experience. In addition, the mobile terminal can automatically select an appropriate blurring algorithm according to the current photographing environment parameters, without the need for manual selection by the user, which can achieve user-perception-free blurring, reduce the user's learning costs and improve the usage experience.

In some embodiments, the obtaining module 10 is configured to:
  in response to a mobile terminal turning on an optical lens mode, output a selection interface displaying the optical lens effects; and
  receive a user input instruction on the selection interface, and generate the corresponding lens effect instruction based on the user input instruction.

It can be seen from the above that, in embodiments of the disclosure, a plurality of preset blurring algorithms are stored in the mobile terminal, so that different blurring algorithms can be used for different photographing scenes, and different optical lens effects can be specifically simulated in different photographing scenes, so as to improve the image quality, and meet the requirements of the user for taking photos in various scenarios. Moreover, the blurring algorithm is selected by the user independently, which improves the user's photographing operability and improves the user's photographing experience.

In some embodiments, the blurring processing module 20 is configured to:
  divide the image to be processed into at least two layers to be blurred;
  obtain respective blurred layers by filtering each layer to be blurred; and
  obtain the target image by fusing the blurred layers.

It can be seen from the above that, in embodiments of the disclosure, the image to be processed is divided into a plurality of layers to be blurred, and respective layers to be blurred are filtered and fused together to obtain the target image, so that a suitable filtering effect can be provided for each blurred layer, to improve the bokeh effect of each blurred layer, and improve the imaging quality.

In some embodiments, the blurring processing module 20 is configured to:
  obtain a light spot layer and a background layer by dividing the image to be processed;
  obtain a background result layer by filtering the background layer, and obtain a light spot result layer by filtering the light spot layer based on a preset aperture etching mask layer; and obtain the target image by fusing the background result layer and the light spot result layer.

It can be seen from the above, in embodiments of the disclosure, the aperture etching effect of the image light spot is enhanced based on the aperture etching mask layer, so that swirly bokeh effect of the image can be simulated, and the imaging atmosphere is improved.

In some embodiments, the blurring processing module 20 is configured to:
convert the image to be processed from a color image to a black-white image;
divide the black-white image into at least two layers to be blurred;
obtain respective blurred layers by filtering each layer to be blurred; and
obtain the target image by fusing the blurred layers.

It can be seen from the above, in embodiments of the disclosure, the bokeh effect of black-white image is realized. The image to be processed is divided into multiple layers to be blurred, each layer to be blurred is filtered separately and then fused together to generate the target image, so that a suitable filtering effect can be provided for each layer, to improve the bokeh effect of each layer, and simulate the imaging effect of the black-white lens of the image, thereby improving the imaging quality.

In some embodiments, the blurring processing module 20 is configured to:
divide the image to be processed into at least two layers to be blurred;
obtain respective blurred layers by filtering each layer to be blurred;
obtain an intermediate image by fusing the blurred layers; and
obtain the target image by performing highlight enhancement processing on the intermediate image.

It can be seen from the above, in embodiments of the disclosure, the image to be processed is divided into multiple layers to be blurred, each layer to be blurred is filtered separately and then fused together to obtain the target image, so that each layer can be provided with a suitable filtering effect, to improve the bokeh effect of each layer, and to simulate a soft focus lens imaging effect of the image, thereby improving the imaging quality. In addition, highlight enhancement is performed on the image to brighten the portrait, so that the overall image is more delicate and soft, thereby avoiding problems such as dark portrait, and making the portrait more prominent.

In some embodiments, the blurring processing module 20 is further configured to:
in response to a mobile terminal turning on an optical lens mode and switching from a first optical lens effect to a second optical lens effect, obtain processing data of the image to be processed in a first blurring algorithm processing process corresponding to the first optical lens effect; and
perform image processing on the image to be processed based on the processing data by using a second blurring algorithm corresponding to the second optical lens effect.

It can be seen from the above, in embodiments of the disclosure, when switching the optical lens effect, the following image processing can be performed based on the previous image processing data, to reduce the amount of image processing operations and shorten the image processing duration, thereby improving the efficiency.

In a third aspect, embodiments of the disclosure provide a mobile terminal. The mobile terminal includes:
a processor; and
a memory having computer instructions stored thereon, in which the computer instructions are configured to cause the processor to implement the method according to any embodiment of the first aspect.

In a fourth aspect, embodiments of the disclosure provide a storage medium having computer instructions stored thereon. The computer instructions are configured to cause a computer to implement the method according to any embodiment of the first aspect.

Figure 13:
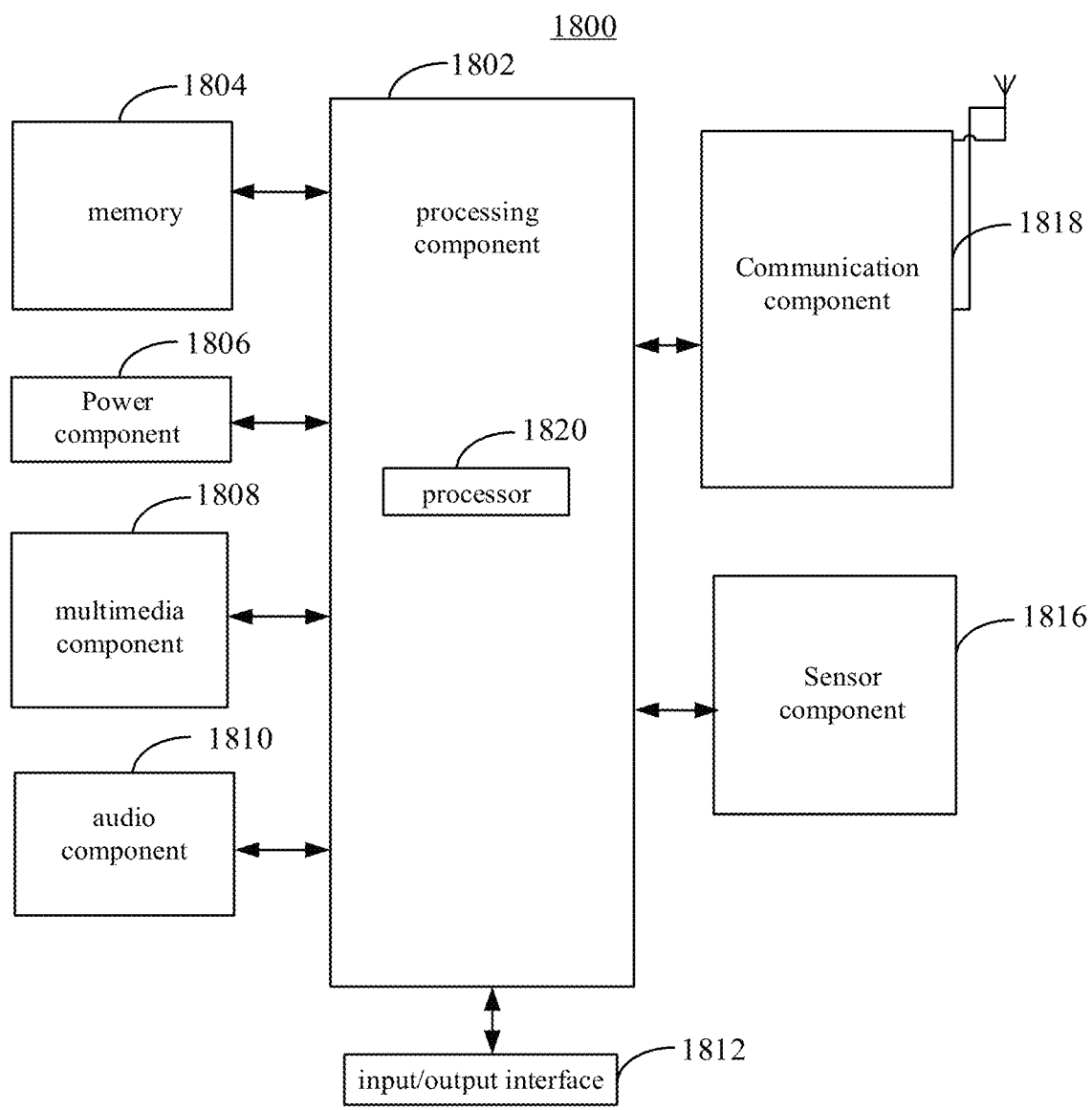
FIG. 13 is a block diagram of a mobile terminal according to some embodiments of the disclosure.

FIG. 13 is a block diagram of a mobile terminal according to some embodiments of the disclosure. The related principles of the mobile terminal and the storage medium according to some embodiments of the disclosure will be described below with reference to FIG. 13.

As illustrated in FIG. 13, the mobile terminal 1800 may include one or more of the following components: a processing component 1802, a memory 1804, a power component 1806, a multimedia component 1808, an audio component 1810, an input/output (I/O) interface 1812, a sensor component 1816, and a communication component 1818.

The processing component 1802 typically controls overall operations of the mobile terminal 1800, such as the operations associated with display, telephone calls, data communications, camera operations, and recording operations. The processing component 1802 may include one or more processors 1820 to execute instructions. Moreover, the processing component 1802 may include one or more modules which facilitate the interaction between the processing component 1802 and other components. For example, the processing component 1802 may include a multimedia module to facilitate the interaction between the multimedia component 1808 and the processing component 1802. For another example, the processing component 1802 can read executable instructions from the memory, to implement mobile terminal related functions.

The memory 1804 is configured to store various types of data to support the operation of the mobile terminal 1800. Examples of such data include instructions for any applications or methods operated on the mobile terminal 1800, contact data, phonebook data, messages, photos, and video. The memory 1804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1806 provides power to various components of the mobile terminal 1800. The power component 1806 may include a power management system, one or more power sources, and any other components associated with the generation, management, and distribution of power in the mobile terminal 1800.

The multimedia component 1808 includes a screen providing an output interface between the mobile terminal 1800 and the user. In some embodiments, the multimedia component 1808 includes a front camera and/or a rear camera. When the mobile terminal 1800 is in an operation mode, such as a shooting mode or a video mode, the front camera and/or the rear camera may receive external multimedia data. Each front camera and rear camera can be a fixed optical lens system or have focal length and optical zoom capabilities.

The audio component 1810 is configured to output and/or input audio signals. For example, the audio component 1810 includes a microphone (MIC) configured to receive an external audio signal when the mobile terminal 1800 is in an operation mode, such as a call mode, a recording mode, and a voice recognition mode. The received audio signal may be further stored in the memory 1804 or transmitted via the communication component 1818. In some embodiments, the audio component 1810 further includes a speaker to output audio signals.

The I/O interface 1812 provides an interface between the processing component 1802 and peripheral interface modules, such as a keyboard, a click wheel, buttons, and the like. The buttons may include, but are not limited to, a home button, a volume button, a starting button, and a locking button.

The sensor component 1816 includes one or more sensors to provide status assessments of various aspects of the mobile terminal 1800. For instance, the sensor component 1816 may detect an open/closed status of the mobile terminal 1800, relative positioning of components, e.g., the display and the keypad, of the mobile terminal 1800, a change in position of the mobile terminal 1800 or a component of the mobile terminal 1800, a presence or absence of user contact with the mobile terminal 1800, an orientation or an acceleration/deceleration of the mobile terminal 1800, and a change in temperature of the mobile terminal 1800. The sensor component 1816 may include a proximity sensor configured to detect the presence of nearby objects without any physical contact. The sensor component 1816 may also include a light sensor, such as a CMOS or CCD image sensor, for use in imaging applications. In some embodiments, the sensor component 1816 may also include an accelerometer sensor, a gyroscope sensor, a magnetic sensor, a pressure sensor, or a temperature sensor.

The communication component 1818 is configured to facilitate communication, wired or wirelessly, between the mobile terminal 1800 and other devices. The mobile terminal 1800 can access a wireless network based on a communication standard, such as WiFi, 2G, 3G, 4G, 5G, 6G, or a combination thereof. In an exemplary embodiment, the communication component 1818 receives a broadcast signal or broadcast associated information from an external broadcast management system via a broadcast channel. In an exemplary embodiment, the communication component 1818 further includes a near field communication (NFC) module to facilitate short-range communications. For example, the NFC module may be implemented based on a radio frequency identity (RFID) technology, an infrared data association (IrDA) technology, an ultra-wideband (UWB) technology, a Bluetooth (BT) technology, and other technologies.

In exemplary embodiments, the mobile terminal 1800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components.

Obviously, the above embodiments are only examples for clear description, and are not intended to limit the embodiments. For those skilled in the art, changes or modifications in other forms can also be made on the basis of the above description, and there is no need to illustrate all the implementations and the implementations cannot all be included herein. However, the obvious changes or modifications derived from this are still within the protection scope of the disclosure.

What is claimed is:

1. A method for processing an image, comprising:
   obtaining a lens effect instruction, and determining a target blurring algorithm from a plurality of preset blurring algorithms based on the lens effect instruction, wherein the plurality of preset blurring algorithms are algorithms for simulating optical lens effects;
   obtaining a target image by blurring an image to be processed based on the target blurring algorithm;
   in response to a mobile terminal turning on an optical lens mode and switching from a first optical lens effect to a second optical lens effect, obtaining processing data of the image to be processed in a first blurring algorithm processing process corresponding to the first optical lens effect; and
   performing image processing on the image to be processed based on the processing data by using a second blurring algorithm corresponding to the second optical lens effect;
   wherein the optical lens effects comprise at least one of: soft-focus bokeh effect, black and white bokeh effect, swirly bokeh effect and standard bokeh effect.

2. The method of claim 1, wherein obtaining the lens effect instruction comprises:
   in response to a mobile terminal turning on an optical lens mode, obtaining current photographing environment parameters, wherein the photographing environment parameters comprise at least one of a focus distance parameter, an ambient brightness parameter, a subject detection parameter, and a light spot detection parameter; and
   determining the lens effect instruction based on the current photographing environment parameters.

3. The method of claim 2, wherein determining the lens effect instruction based on the current photographing environment parameters comprises:
   determining the lens effect instruction corresponding to a target optical lens effect based on a relation between at least one parameter included in the photographing environment parameters and corresponding preset conditions.

4. The method of claim 3, wherein determining the lens effect instruction corresponding to the target optical lens effect based on the relation between the at least one parameter included in the photographing environment parameters and the corresponding preset conditions, comprises:
   in response to the focus distance parameter satisfying a first preset condition, determining an instruction corresponding to no bokeh effect;
   in response to the ambient brightness parameter satisfying a second preset condition, determining an instruction corresponding to soft-focus bokeh effect as the lens effect instruction;
   in response to the subject detection parameter satisfying a third preset condition, determining an instruction corresponding to black and white bokeh effect as the lens effect instruction;
   in response to the light spot detection parameter satisfying a fourth preset condition, determining an instruction corresponding to swirly bokeh effect as the lens effect instruction; and
   in response to the focus distance parameter not satisfying the first preset condition, the ambient brightness parameter not satisfying the second preset condition, the subject detection parameter not satisfying the third preset condition, and the light spot detection parameter not satisfying the fourth preset condition, determining an instruction corresponding to standard bokeh effect as the lens effect instruction.

5. The method of claim 1, wherein obtaining the lens effect instruction comprises:
   in response to a mobile terminal turning on an optical lens mode, outputting a selection interface displaying the optical lens effects; and
   receiving a user input instruction on the selection interface, and generating the corresponding lens effect instruction based on the user input instruction.

6. The method of claim 1, wherein in response to the target blurring algorithm being a standard bokeh algorithm, obtaining the target image by blurring the image to be processed based on the target blurring algorithm, comprises:
   dividing the image to be processed into at least two layers to be blurred;
   obtaining respective blurred layers by filtering each layer to be blurred; and
   obtaining the target image by fusing the respective blurred layers.

7. The method of claim 1, wherein in response to the target blurring algorithm being a swirly bokeh algorithm, obtaining the target image by blurring the image to be processed based on the target blurring algorithm, comprises:
   obtaining a light spot layer and a background layer by dividing the image to be processed;
   obtaining a background result layer by filtering the background layer, and obtaining a light spot result layer by filtering the light spot layer based on a preset aperture etching mask layer; and
   obtaining the target image by fusing the background result layer and the light spot result layer.

8. The method of claim 1, wherein in response to the target blurring algorithm being a black and white bokeh algorithm, obtaining the target image by blurring the image to be processed based on the target blurring algorithm, comprises:
   converting the image to be processed from a color image to a black-white image;
   dividing the black-white image into at least two layers to be blurred;
   obtaining respective blurred layers by filtering each layer to be blurred; and
   obtaining the target image by fusing the respective blurred layers.

9. The method of claim 1, wherein in response to the target blurring algorithm being a soft-focus bokeh algorithm, obtaining the target image by blurring the image to be processed based on the target blurring algorithm, comprises:
   dividing the image to be processed into at least two layers to be blurred;
   obtaining respective blurred layers by filtering each layer to be blurred;
   obtaining an intermediate image by fusing the respective blurred layers; and
   obtaining the target image by performing highlight enhancement processing on the intermediate image.

10. A mobile terminal, comprising:
    a processor; and
    a memory having computer instructions stored thereon, wherein the processor is configured to:
    obtain a lens effect instruction, and determine a target blurring algorithm from a plurality of preset blurring algorithms based on the lens effect instruction, wherein the plurality of preset blurring algorithms are algorithms for simulating optical lens effects;
    obtain a target image by blurring an image to be processed based on the target blurring algorithm;
    in response to a mobile terminal turning on an optical lens mode and switching from a first optical lens effect to a second optical lens effect, obtain processing data of the image to be processing in a first blurring algorithm processing process corresponding to the first optical lens effect; and
    perform image processing on the image to be processed based on the processing data by using a second blurring algorithm corresponding to the second optical lens effect;
    wherein the optical lens effects comprise at least one of: soft-focus bokeh effect, black and white bokeh effect, swirly bokeh effect and standard bokeh effect.

11. The mobile terminal of claim 10, wherein the processor is configured to:
    in response to a mobile terminal turning on an optical lens mode, obtain current photographing environment parameters, wherein the photographing environment parameters comprise at least one of a focus distance parameter, an ambient brightness parameter, a subject detection parameter, and a light spot detection parameter; and
    determine the lens effect instruction based on the current photographing environment parameters.

12. The mobile terminal of claim 11, wherein the processor is configured to:
    determine the lens effect instruction corresponding to a target optical lens effect based on a relation between at least one parameter included in the photographing environment parameters and corresponding preset conditions;
    wherein determining the processor is configured to:
    in response to the focus distance parameter satisfying a first preset condition, determine an instruction corresponding to no bokeh effect;
    in response to the ambient brightness parameter satisfying a second preset condition, determine an instruction corresponding to soft-focus bokeh effect as the lens effect instruction;
    in response to the subject detection parameter satisfying a third preset condition, determine an instruction corresponding to black and white bokeh effect as the lens effect instruction;
    in response to the light spot detection parameter satisfying a fourth preset condition, determine an instruction corresponding to swirly bokeh effect as the lens effect instruction; and
    in response to the focus distance parameter not satisfying the first preset condition, the ambient brightness parameter not satisfying the second preset condition, the subject detection parameter not satisfying the third preset condition, and the light spot detection parameter not satisfying the fourth preset condition, determine an instruction corresponding to standard bokeh effect as the lens effect instruction.

13. The mobile terminal of claim 10, wherein the processor is configured to:
    in response to a mobile terminal turning on an optical lens mode, output a selection interface displaying the optical lens effects; and
    receive a user input instruction on the selection interface, and generate the corresponding lens effect instruction based on the user input instruction.

14. The mobile terminal of claim 10, wherein in response to the target blurring algorithm being a standard blurring algorithm, the processor is configured to:
divide the image to be processed into at least two layers to be blurred;
obtain respective blurred layers by filtering each layer to be blurred; and
obtain the target image by fusing the respective blurred layers.

15. The mobile terminal of claim 10, wherein in response to the target blurring algorithm being a swirly bokeh algorithm, the processor is configured to:
obtain a light spot layer and a background layer by dividing the image to be processed;
obtain a background result layer by filtering the background layer, and obtain a light spot result layer by filtering the light spot layer based on a preset aperture etching mask layer; and
obtain the target image by fusing the background result layer and the light spot result layer.

16. The mobile terminal of claim 10, wherein in response to the target blurring algorithm being a black and white bokeh algorithm, the processor is configured to:
convert the image to be processed from a color image to a black-white image;
divide the black-white image into at least two layers to be blurred;
obtain respective blurred layers by filtering each layer to be blurred; and
obtain the target image by fusing the respective blurred layers.

17. The mobile terminal of claim 10, wherein in response to the target blurring algorithm being a soft-focus bokeh algorithm, the processor is configured to:
divide the image to be processed into at least two layers to be blurred;
obtain respective blurred layers by filtering each layer to be blurred;
obtain an intermediate image by fusing the respective blurred layers; and
obtain the target image by performing highlight enhancement processing on the intermediate image.

18. A non-transitory storage medium having computer instructions stored thereon, wherein the computer instructions are configured to cause a computer to implement a method for processing an image, the method comprising:
obtaining a lens effect instruction, and determining a target blurring algorithm from a plurality of preset blurring algorithms based on the lens effect instruction, wherein the plurality of preset blurring algorithms are algorithms for simulating optical lens effects;
obtaining a target image by blurring an image to be processed based on the target blurring algorithm;
in response to a mobile terminal turning on an optical lens mode and switching from a first optical lens effect to a second optical lens effect, obtaining processing data of the image to be processed in a first blurring algorithm processing process corresponding to the first optical lens effect; and
performing image processing on the image to be processed based on the processing data by using a second blurring algorithm corresponding to the second optical lens effect;
wherein the optical lens effects comprise at least one of: soft-focus bokeh effect, black and white bokeh effect, swirly bokeh effect and standard bokeh effect.

* * * * *